US011429865B1

(12) United States Patent
Patton et al.

(10) Patent No.: US 11,429,865 B1
(45) Date of Patent: Aug. 30, 2022

(54) OPTIMIZING NEURAL NETWORKS

(71) Applicant: UT Battelle, LLC, Oak Ridge, TN (US)

(72) Inventors: Robert M. Patton, Oak Ridge, TN (US); Steven R. Young, Oak Ridge, TN (US); Derek C. Rose, Oak Ridge, TN (US); Thomas P. Karnowski, Oak Ridge, TN (US); Seung-Hwan Lim, Oak Ridge, TN (US); Thomas E. Potok, Oak Ridge, TN (US); J. Travis Johnston, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 565 days.

(21) Appl. No.: 16/265,252

(22) Filed: Feb. 1, 2019

Related U.S. Application Data

(60) Provisional application No. 62/640,122, filed on Mar. 8, 2018.

(51) Int. Cl.
*G06N 3/08* (2006.01)
(52) U.S. Cl.
CPC ............ *G06N 3/086* (2013.01); *G06N 3/082* (2013.01)
(58) Field of Classification Search
CPC .............................. G06N 3/086; G06N 3/082
USPC .......................................................... 706/25
See application file for complete search history.

(56) References Cited

U.S. PATENT DOCUMENTS

2019/0080240 A1* 3/2019 Andoni .................. G06N 7/005

OTHER PUBLICATIONS

Mussi, et. al., "GPU-based Asynchronous Particle Swarm Optimization", GECCO'11, Jul. 12-16, 2011, Dublin, Ireland (Year: 2011).*
Dongarra, et al., "The quest for petascale computing", Computing in Science & Engineering vol. 1, Issue:2, May-Jun. 2001 (Year: 2001).*
Kabir et. al., "A New Evolutionary Algorithm for Extracting a Reduced Set of Interesting Association Rules", 2015 (Year: 2015).*

(Continued)

*Primary Examiner* — Omar F Fernandez Rivas
*Assistant Examiner* — Selene A. Haedi
(74) *Attorney, Agent, or Firm* — Lempia Summerfield Katz LLC

(57) ABSTRACT

A system and method design and optimize neural networks. The system and method include a data store that stores a plurality of gene vectors that represent diverse and distinct neural networks and an evaluation queue stored with the plurality of gene vectors. Secondary nodes construct, train, and evaluate the neural network and automatically render a plurality of fitness values asynchronously. A primary node executes a gene amplification on a select plurality of gene vectors, a crossing-over of the amplified gene vectors, and a mutation of the crossing-over gene vectors automatically and asynchronously, which are then transmitted to the evaluation queue. The process continuously repeats itself by processing the gene vectors inserted into the evaluation queue until a fitness level is reached, a network's accuracy level plateaus, a processing time period expires, or when some stopping condition or performance metric is met or exceeded.

21 Claims, 11 Drawing Sheets

(56) References Cited

OTHER PUBLICATIONS

Venkatesan et. al., "A genetic algorithm-based artificial neural network model for the optimization of machining processes", 2009 (Year: 2009).*
Gebreel, "An Adaptive Interactive Multi-objective Optimization Approach Based on Decision Neural Network", 2016 (Year: 2016).*
Terwilliger, Vertex Reconstruction of Neutrino Interactions Using Deep Learning, pp. 2275 to 2281, IEEE 2017.
Young, Evolving Deep Networks Using HPC, 7 pgs., Nov. 12-17, 2017.

* cited by examiner

OPTIMIZING NEURAL NETWORKS

PRIORITY CLAIM

This application claims priority to U.S. Provisional Patent Application No. 62/640,122, titled "Method for Designing Optimal Convolutional Neural Networks using Parallel Computers" which was filed on Mar. 8, 2018, which is herein incorporated by reference.

STATEMENT REGARDING FEDERALLY SPONSORED RESEARCH AND DEVELOPMENT

These inventions were made with United States government support under Contract No. DE-AC05-00OR22725 awarded by the United States Department of Energy. The United States government has certain rights in the inventions.

BACKGROUND

Technical Field

This disclosure relates to networks and more specifically to generating and optimizing (deep) neural networks.

Related Art

Designing neural networks is challenging. Designs have many topologies and use many diverse parameters. Some designs adopt "off-the-shelf" configurations. Once adopted, hyperparameters are handpicked and hand-tuned to different datasets. Defining hyperparameters efficiently and effectively is complex and computationally intensive. Some designs apply loose heuristics, others apply guesswork, and others rely on a designer's intuition. While some approaches find success, that success is often happenstance and is time consuming.

DETAILED DESCRIPTION

Deep learning and artificial neural networks are used in many fields including automatic speech recognition (ASRs), commercial vision, image analysis (e.g., medical and scientific analysis), drug development, and automated vehicle control, for example. The disclosed systems and methods (referred to as a system or systems) automatically generate and optimize artificial neural networks (also referred to as NN, deep learning networks, or hierarchical learning networks) by determining the number of layers of the network, the sequence of those layers, the layer types, and/or the optimization of hyperparameters automatically. The systems apply an automated asynchronous evolutionary process that may generate and optimize deep neural networks in parallel on a gigascale, petascale, terascale, etc. platform and/or on a lesser distributed parallel processing platform such as Local Area Network (LAN) connected computers or devices within a building or a small group of buildings. Using a genetic algorithm, where layer types and parameters are encoded in one or more digital genes (referred to as a gene or genes), characteristics of the deep learning and/or neural networks are automatically generated and optimized. A digital gene describes and models complex networks such as a deep learning and/or a neural network. Neural networks are a class of machines and/or devices that execute machine learning algorithms where artificial neurons form a computational unit and networks describe the interconnectivity among each other via weights. Neural networks use artificial neurons (often in the form of identity functions that provide an output), connections and weights (where each connection is identified by a weight), a propagation function to provide an input for the resulting output, and one or more learning rules used to modify the parameters of the neural network to provide a favorable output. Some networks are generated and optimized to dataset representations using one or more graphics processors, others are generated and optimized using high-performance computing machines, others are generated and optimized using one or more processors, and others by using combinations of these architectures. Each of these systems takes advantage of local volatile and non-volatile memory. The term optimized or optimization refers to the network's performance with respect to given characteristics that are superior to the performance of other possible network configurations with respect to those characteristics. An optimization is more than an improvement or a learning system.

Figure 1:
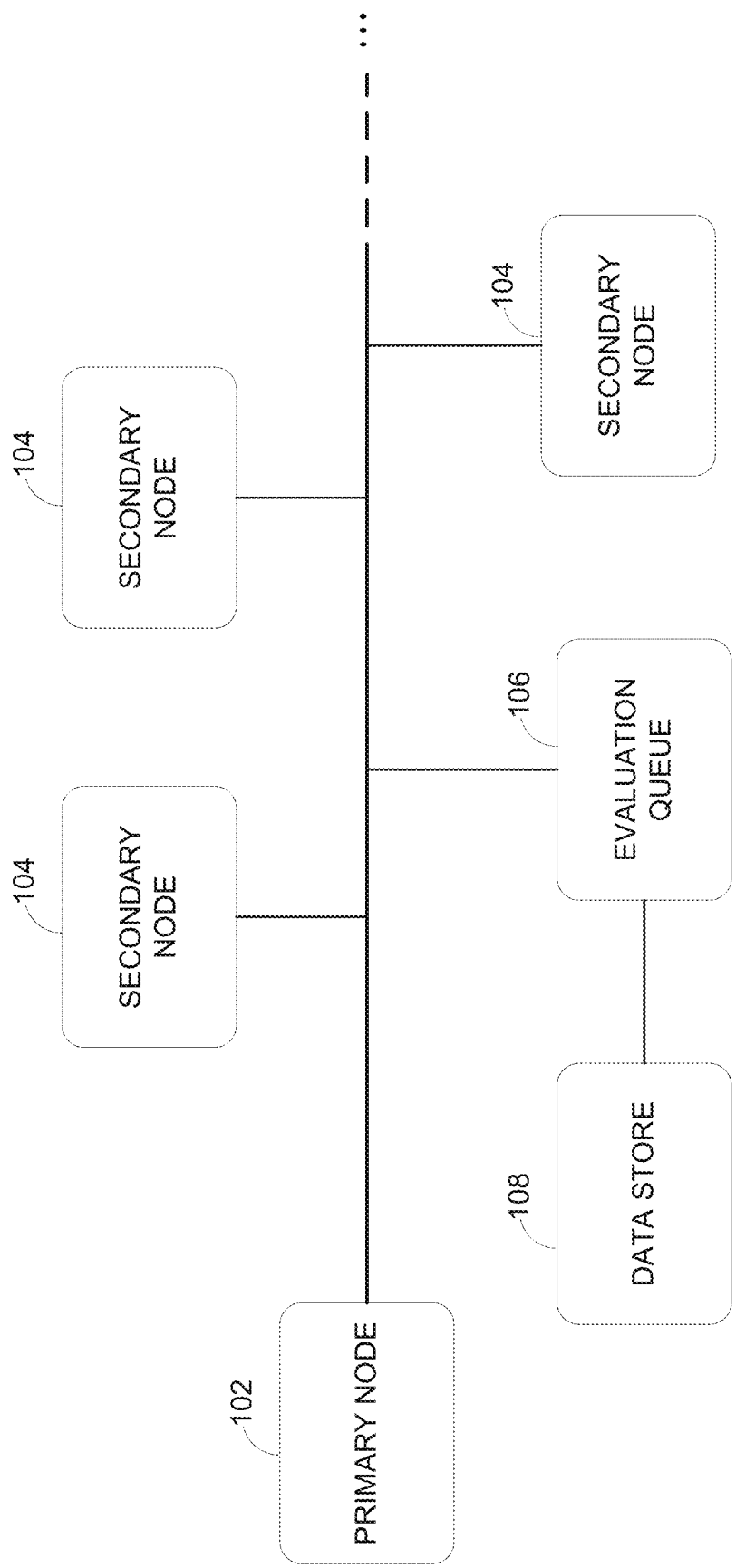
FIG. 1 is a block diagram of an evolutionary network.

FIG. 1 is a block diagram of an evolutionary network that designs and optimizes deep learning and/or neural networks (hereinafter referred to as a neural network or neural networks). In FIG. 1, the primary node 102 produces neural networks represented by gene vectors (referred to as genes) through evolutionary processes. The secondary nodes 104 render, train, and evaluate the fitness of a population of neural networks also represented by genes. Each of the nodes 102 and 104 are clients, servers, or peers to the other nodes and utilize a separate processor or graphical processor unit that communicate through a communication system such as a bus. The secondary nodes 104 operate asynchronously and independently and process neural networks simultaneously in parallel (i.e., of or relating to the processing of multiple neural networks happening or running in tandem at the same time). Each secondary node 104 is analogous to a separate processor with accesses to local memory that render, train, and evaluate different neural networks through a parallel architecture.

In FIG. 1, an evaluation queue 106 receives and stores one or more genes from a data store 108. The evaluation queue 106 is a multi-element data structure that follows a first-in-first-out (FIFO) sequence. In alternate systems, gene removal from the evaluation queue 106 is based on factors other than the order of insertion; for example, when a priority value is assigned to one or more genes, the priority value may change the output sequence. In yet another alternate system, a dequeue is used in which genes are added or removed from either an insertion input/output (I/O) port or a removal I/O port of the dequeue. That is, the dequeue can operate in a last-in-first-out (LIFO) sequence, a FIFO sequence, or a combination of LIFO and FIFO sequences during an evolutionary session. A session refers to the time during which the evolutionary network process neural networks.

In FIG. 1, one or more genes represent a single neural network that is stored and accessed by the secondary nodes 104 through the evaluation queue 106. Before startup, the evaluation queue 106 is seeded with one or more genes that define a variety of distinct neural networks. The genes are persisted in the data store 108. The data store 108 stores genes of the different network designs that are randomly or specifically generated. Preferably, the number of neural networks stored in the evaluation queue 106 (e.g., its depth) represents more than three times the number of secondary nodes 104 in the evolutionary network. The evaluation queue's 106 depth limits bottlenecks and ensures processing continuity during the evolutionary process.

Figure 2:
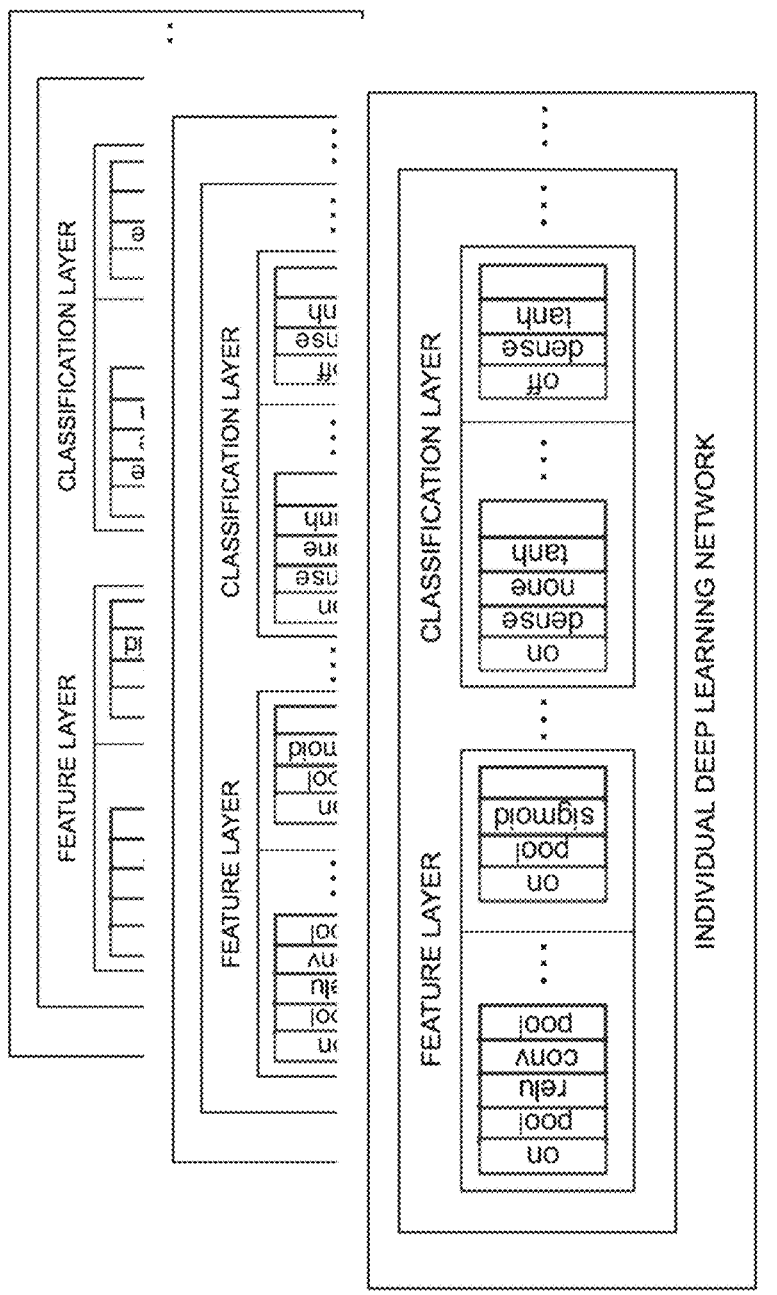
FIG. 2 is a block diagram of an exemplary genetic encoding in a population of neural networks.

FIG. 2 shows an exemplary genetic encoding of a neural network in a population of neural networks. The first part of the exemplary representation of the gene is designated a "feature layer". The parameters that makeup the featured layer define neural layers including convolution layers, pooling layers, normalization layers, rectified linear unit layers, etc. or any other layer that may be used in a neural network. In some systems, the layers process two-dimensional maps representing original input images. An image is a stored description of a graphic picture made up of a set of brightness and color values of pixels. A fully connected layer may define another part of one or more genes which is referred to as the classification layers in FIG. 2. The fully connected layer executes the highest level of reasoning executed by the neural networks and have connections to all of the activation layers of the preceding layer.

In FIG. 2, an encoding function renders portions of the genetic structure from integers that represented the requirements of each layer's hyperparameters. Hyperparameters include whether a layer is turned on or off, the type of layer it is, the activation functions, the number of neurons of the layer, the kernel size, the stride, the padding, the learning rates, the weight initialization schemes for each layer, etc. The encoding functions convert integers to floating point ranges, $x \in [a, b] \in R$ for each of the hyperparameters. For ordinal hyperparameters (e.g., those associated with pooling type and weight initializations, etc.), integers are mapped to a range of enumerated layer types.

A type enumeration and a layer on/off variable occupies the first field of a gene feature layer and classification layer as shown in FIG. 2. Each layer also has a marker field for an activation function which is chained to the layer. The encoded parameter fields that follow may be fixed to a predetermined count that allows a gene to represent a layer type having many hyperparameters (e.g., in some systems, there may be more than eleven hyperparameter values). Each layer type may define distinct functions that define the processing executed by that layer. In FIG. 2, unbound encodings are inactive and are ignored when constructing a neural network but maintained in the genetic structure of the constructed neural networks. The encoding may also include meta data and fields that define the number of possible layers of a neural network and their ability to activate or deactivate one or more individual layers.

Some exemplary genetic encodings track a current layer's input/output dimensions and apply I/O rules that limit the selected hyperparameters (e.g., pool kernel size) of a layer to ranges that fall within other ranges that can be processed by the input of a subsequent layer. A next layer's input dimensions may be determined after hyperparameters of an immediately preceding layer are defined, which modifies the amount data that can flow to the backend of the neural network. By applying limiting rules, a progressive constraint may be generated, tracked, stored in memory, and applied by the evolutionary network to ensure that changes in a preceding layer is compliant and cascades through the requirements of the subsequent backend layers. The progressive constraint limits the possible configurations represented by later genes. In some exemplary evolutionary systems, the asynchronous crossover described below effectively creates an inheritance of layer types and parameters. The encoding range and dimensionality constraints smoothly limit inherited characteristics such as how many pixels a neural network may process (e.g., the kernel size).

Figure 3:
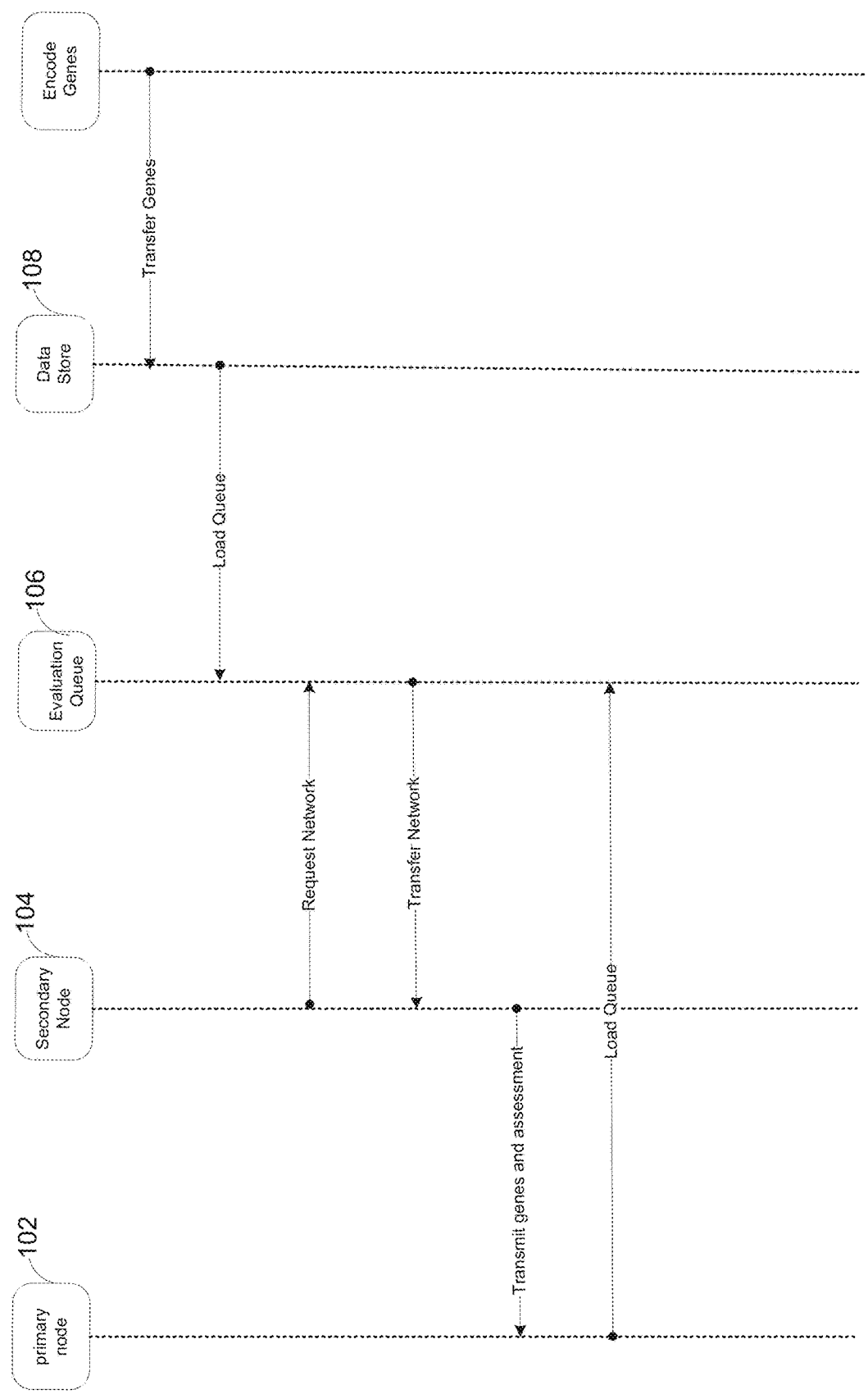
FIG. 3 is a flow diagram of an asynchronous evolutionary process.

FIG. 3 is a flow diagram of an asynchronous evolutionary process. The process begins with the transfer of one or more genes that encode a plurality of distinct neural networks from the data store 108. To ensure each secondary node 104 receives a different neural network to generate/train/evaluate per cycle—that is one network per cycle, the evaluation queue 106 is seeded with diverse and distinct neural networks that are at least three times the number of secondary nodes 104 of the evolutionary network. For example, if there are thirty secondary nodes 104 in an evolutionary network, the data store 108 seeds the evaluation queue 106 with genes that represent ninety pre-generated different neural networks or more to ensure continuity and minimize processing bottlenecks. The networks may be randomly generated (e.g., generated using random values generated through a normally distributed Pseudo Random Number Generator (PRNG) based on predetermined initial values of network parameters such as weights and tolerance ranges (e.g., the number of input/outputs) established by a user), may be "off-the-shelf" neural networks, or may be specific pre-generated neural networks created prior to the beginning of the evolutionary process.

Figure 4:
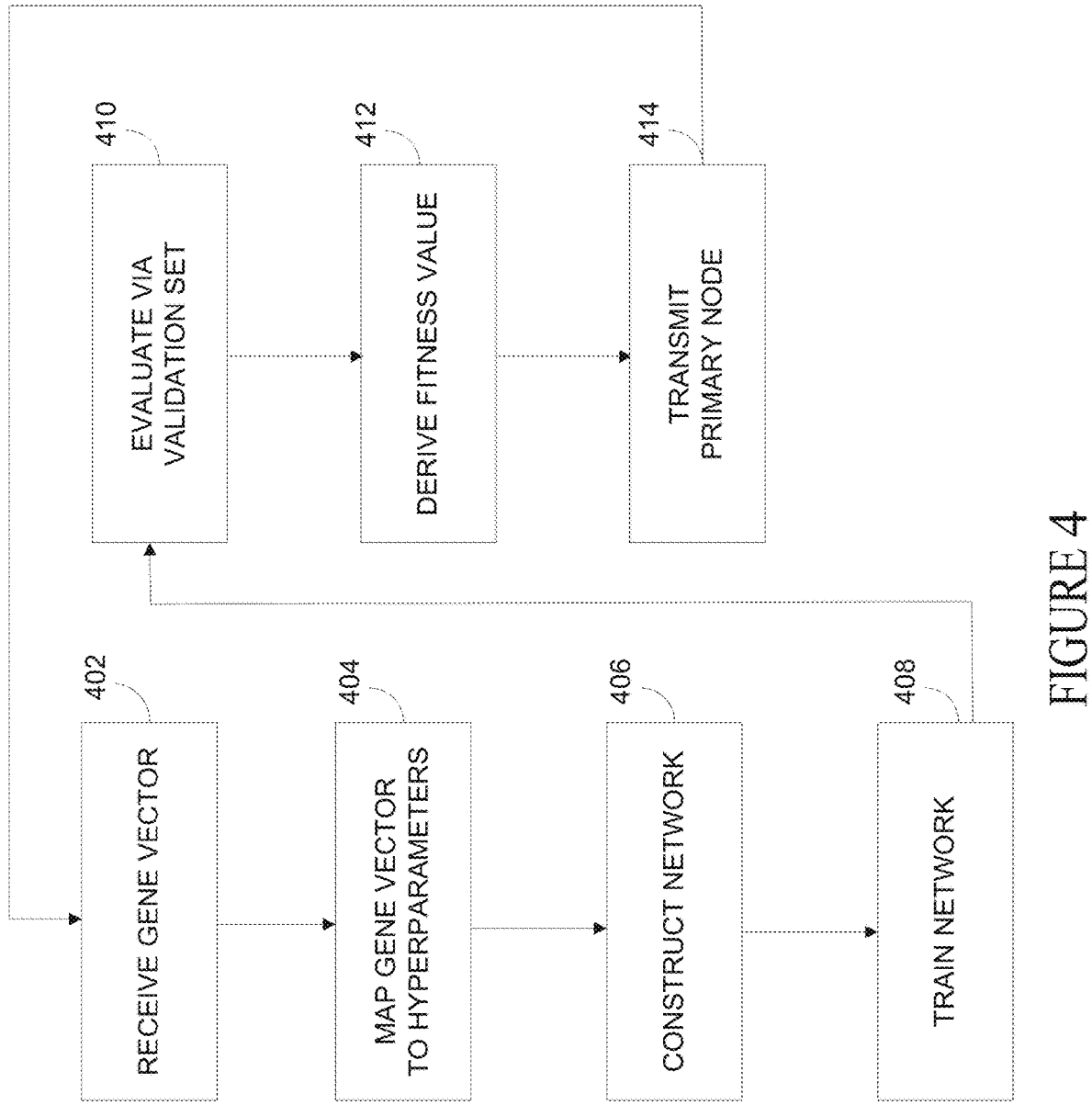
FIG. 4 is a flow diagram of network construction and evaluation at a secondary node.

When the evaluation queue 106 receives a request for a neural network, the evaluation queue 106 transfers one or more genes to the requesting secondary node 104 that represent an individual neural network. When the one or more genes are received at 402, the requesting secondary node 104 decodes the one or more genes by mapping the parameters and classification layers to a neural network at 404 as represented in FIG. 4. The requesting secondary node 104 then constructs the neural network at 406 and trains the constructed neural network using learning data representations or a training dataset stored in a local or a remotely accessible memory using a machine-learning algorithm such as a stochastic gradient descent (SGD) learning with a backpropagation, for example. The weights of the network may be adjusted via the machine-learning algorithm that processes the gradients of a mathematical loss function. Training may occur through a fixed number of iterations, a predetermined amount of time, and/or until the constructed neural network hits a fitness threshold during a training session at 408. Some neural network train by iteratively reading a training dataset set a predetermined number of times while tuning the neural network's hyperparameter weights and/or other neural network adjustable parameters/ variables. At 410, the trained neural network is evaluated by the secondary node 104 by processing an evaluation dataset that is separate from and different from the training dataset. Based on the trained neural network's performance, the secondary node 104 calculates a fitness value or an average fitness value at 412 that is transmitted with the genes to the primary node at 414. Because the fitness evaluation depends on the application and a desired result, the fitness evaluation will vary. In some use cases, a user or an application defines the evaluation or fitness function that is executed.

Figure 5:
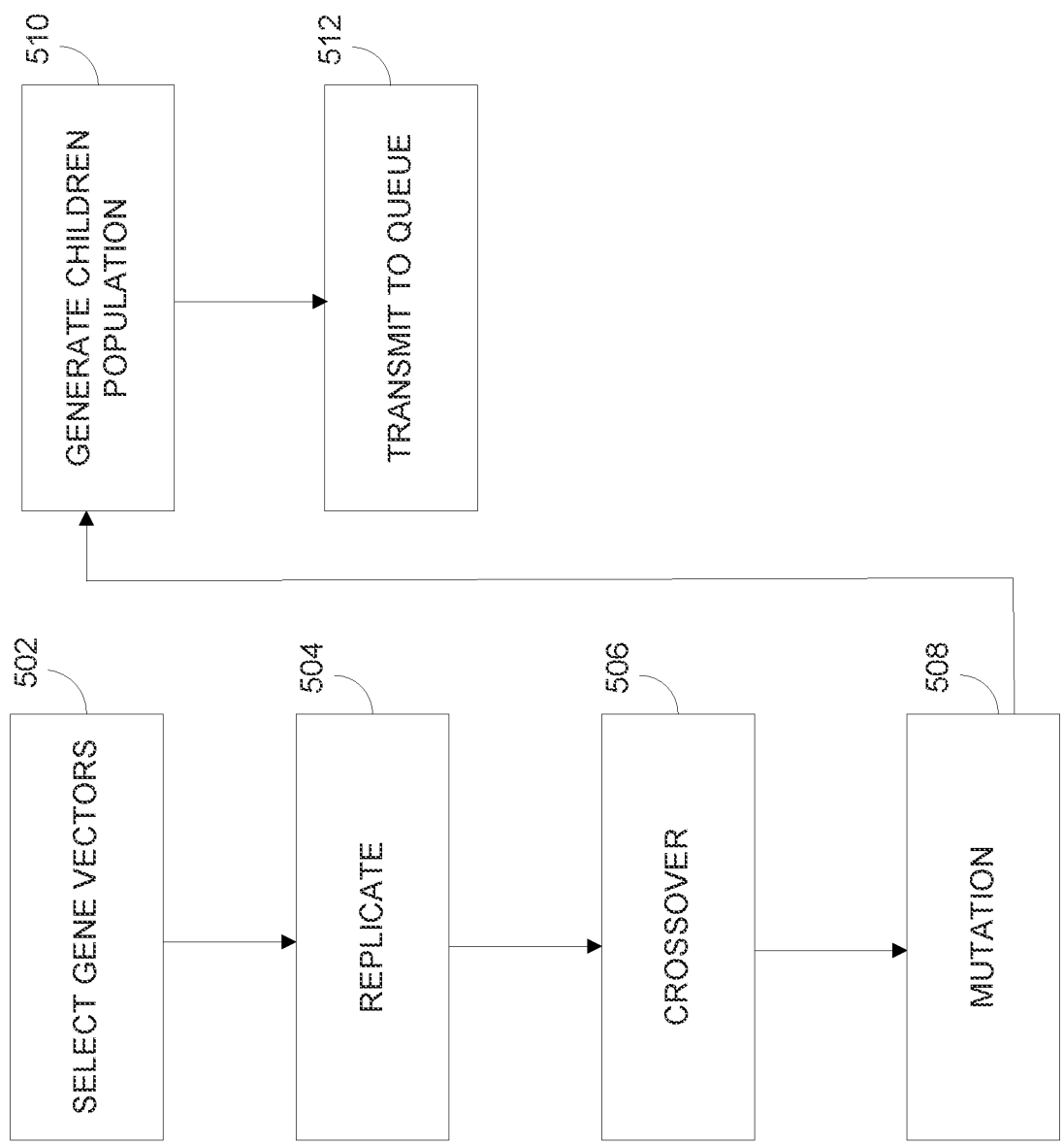
FIG. 5 is a flow diagram of an asynchronous evolutionary process at a primary node.
Figure 6:
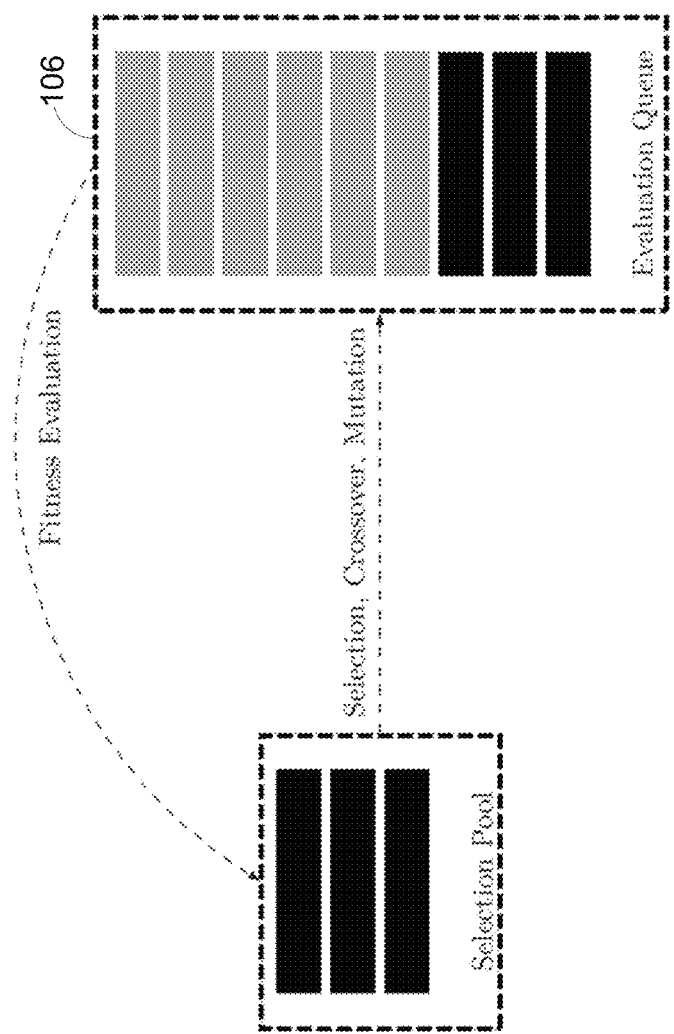
FIG. 6 is a block diagram of a selection, crossover, and mutation.

When one or more fitness values exceed a predetermined threshold at the primary node 102, the primary node 102 selects the genes associated with these neural networks (referred to as the parents) at 502 and executes an asynchronous evolutionary process represented in FIGS. 5 and 6. The threshold may be rendered by a mathematical function (e.g., such as calculating an average accuracy or fitness value and comparing the accuracy or fitness value of each network to this average accuracy/fitness value) to distinguish neural networks with high accuracies from those with low accuracies. The average accuracy/fitness value may comprise a moving average in which the moving average is derived from successive fitness values of the neural networks previously evaluated. In an exemplary use, the moving average maybe calculated from an initial fixed subset of accuracy values associated with a number of previously evaluated neural networks. The subset is then modified, by shifting forward, that is excluding the lowest accuracy value of the series of accuracy/fitness values and including the next accuracy/fitness value that is greater than the pending moving average, $MAVG_t$, or is greater than the lowest accuracy value of the series of accuracy/fitness values to generate a next subset that is processed to calculate the next moving average, $MAVG_{t+1}$. The moving average maybe recalculated in this manner each time an accuracy or fitness value is greater than the moving average it is compared against. The use of a moving average smooths out short-term fluctuations while highlighting longer-term trends. By this and/or other processes, neural networks associated with low accuracy values or low fitness values are discarded by the primary node 102, while neural networks associated with high accuracy values or high fitness values are selected and retained and subject to gene amplification.

The asynchronous evolutionary process executes a gene amplification at 504. A gene amplification is characterized by a production of multiple copies of a selected parent's genes. Amplification occurs by copying those genes that represent the selected parent networks. The timing of the gene amplification and the number of copies of the genes made by the primary node 102 may depend on the number of networks downloaded from the evaluation queue 106 and the time spent constructing, training, and evaluating the neural networks by the secondary nodes 104 (e.g., the efficiency of the secondary node 104). The timing may represent an average amount of time or some other period of time. In other evolutionary networks, gene amplification occurs when the evaluation queue 106 is reduced by a third or alternately, reduced by the number of secondary nodes within the evolutionary network.

At 506 the primary node 102 execute a crossing-over (also referred to as a cross-over) in which two copies of the one or more genes or gene groups (referred to as the gene groups) that represent two selected parent neural networks exchange equal gene segments with each other. The genetic breaks occur at random but corresponding points in the one or more genes or gene groups. Breaks at corresponding points means that the segments that are broken off contain corresponding gene segments. The broken sections are then exchanged between the replicated parents to form completely new neural networks (referred to as the children or offspring). Crossing over results in a recombination of the one or more gene segments found in the parents of the neural networks that would otherwise be transmitted together without crossover. The children or offspring's genes differ from that of either parent because they are combination genes from both parents.

The frequency of the crossing over varies by embodiment. In some embodiments it is proportional to how quickly the secondary nodes 104 build, train, and evaluate neural networks (e.g., the efficiency of the secondary nodes 104). In some embodiments it varies with the complexity of the neural networks. Further, neural networks that are built, trained, and evaluated faster than the other neural networks may have a greater influence or bias on the offspring or the evolution of the neural networks as those neural networks may render candidates more frequently due to their superior performance. Further, by using a random break or random swap of one or more genes or gene groups between the replicated parents in the crossing-over process, the disclosed crossing-over process counteracts the tendency of linked genes, i.e., gene's in the same parent network that are always transmitted together as a group.

With each of the selected parents crossed-over with one another through gene amplification and crossing-over, random changes are made to portions of some of the one or more genes or gene groups of the selected children or offspring at 508. A mutation may randomly select and randomly change some or all portions of a field in the genetic encoding of a randomly selected child. A change to the genetic field may modify a feature layer such as turning a layer on or off, or modify a field in classification layer, or modify another parameter, for example, resulting in a completely different neural network. The mutations randomly alter the characteristics passed on from the parent networks by modifying one or more fields. Most mutations to some or all of the offspring (in which gene segment portions or fields may be randomly changed) may not be beneficial, since any change in the delicate balance of a neural network trained to a dataset tends to be disruptive. Nonetheless, in the disclosed evolutionary process, mutations are advantageous as the random mutations of one or more genes of the offspring allows the neural networks to adapt to untrained, untested, and unforeseen environmental changes or dataset changes and contribute to the evolutionary development that results in greater efficiency, accuracy, and less complex optimized neural networks.

Because the disclosed evolutionary process is repeated a specific number of times, or during a predetermined period of time, or until a particular condition or a performance metric is met or exceeded (e.g., any number of iterative cycles), network layers that are turned off by the crossing over process and/or the mutation process are maintained in the genetic structure of the children or offspring. While inactive, the genetic encoding is maintained so that it may be reactivated in the next evolutionary cycle during a subsequent crossing-over or mutation if it is selected by the primary node 102. Further, while most crossing-over mutations do not introduce drastic changes to the neural networks, they can compress or expand network layers by turning network layers on or off. The crossing-over process and/or the mutation process can move layers in a network structure by turning intermediate network layers on or off, prior network layers on or off, and/or subsequent network layers on or off. The activation or deactivation of network layers effectively changes layer order, positions, or effectively moves layers in a neural network by changing the order of the layers and the layers that directly communicate with one another.

With selection, crossing-over, and mutation executed at 502-508, other networks drawn from the evaluation queue 106 are constructed and evaluated at the secondary nodes 104 (as described in FIG. 4) and the children or offspring population are generated at 510 and transmitted with meta data to the evaluation queue 106 as shown in FIG. 3 and at 512 in FIG. 5. These processes occur concurrently (e.g., happening at the same time) and/or in parallel (e.g., via multiprocessing, where each processing unit or a group of processing units work in tandem on a separate network and a different process; one processor or group may construct, train, and evaluate a network, another may execute a gene amplification, another may execute a gene mutation at the same time). In FIG. 6, the children or offspring are inserted at the bottom of the evaluation queue 106 to be reevaluated by the secondary nodes 104 in later cycles. The process then repeats until a stopping condition or a performance metric is reached or exceeded. The children or offspring are inserted at the bottom of the evaluation queue 106 as the exemplary neural networks in the evaluation queue 106 of FIG. 6 are organized in a FIFO sequence. The meta data may include a unique identifier associated with one or more genes or gene groups, fields that indicates when (e.g., timing) the genes were created, fields that indicate the time the genes were evaluated, fields that identify the secondary node 104 that executed the neural network's evaluation, and/or fields that provide any information associated the creation and evolution of the neural networks. The meta data allows the evolutionary network to track the evolutionary process and allow other systems or users to process the genealogy behind the growth and development of the neural networks. It may also be used by information technology personnel to change the evolutionary process and modify: the stopping condition or performance metric, the number iteration cycles an evolutionary process may execute, the number of neural networks that are seeded in the evaluation queue 106 (e.g., queue size), other queue/network settings (e.g., when alerts issue which may indicate when a specific number of networks are waiting to be evaluated, when a gene has been waiting in the evaluation queue 106 a certain amount of time, etc.), etc.

Figure 7:
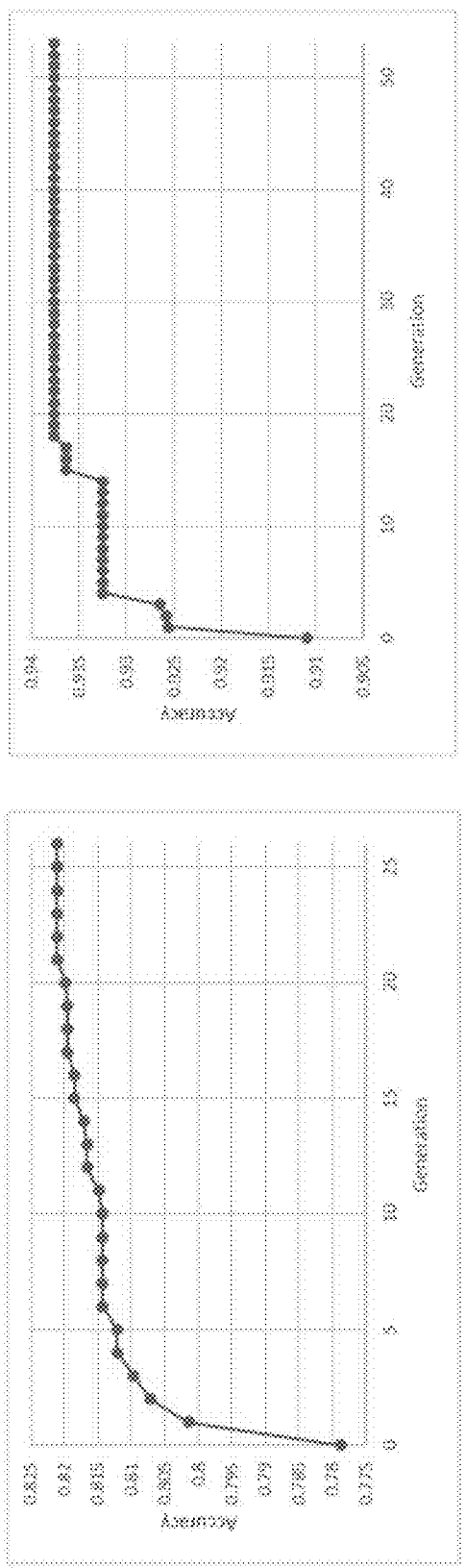
FIG. 7 represents the accuracy of an automatically generated neural network classifying images in different domains.

As shown in FIG. 7, networks will achieve different levels of accuracy in the evolutionary process. In FIG. 7, the chart to the left shows the improvement in the neural network's accuracy in identifying a neutrino vertex as it evolves and the chart on the right shows the improvement in accuracy of another neural network's identification of mitochondria in cells as it evolves. As shown, the rendered networks attain different accuracy levels and develop at different development rates.

Each network improved at different rates and made a significant improvement in their identifications. As shown, their accuracies plateaued, which may be used as a stopping condition for the evolutionary network or in the evolutionary process.

Figure 8:
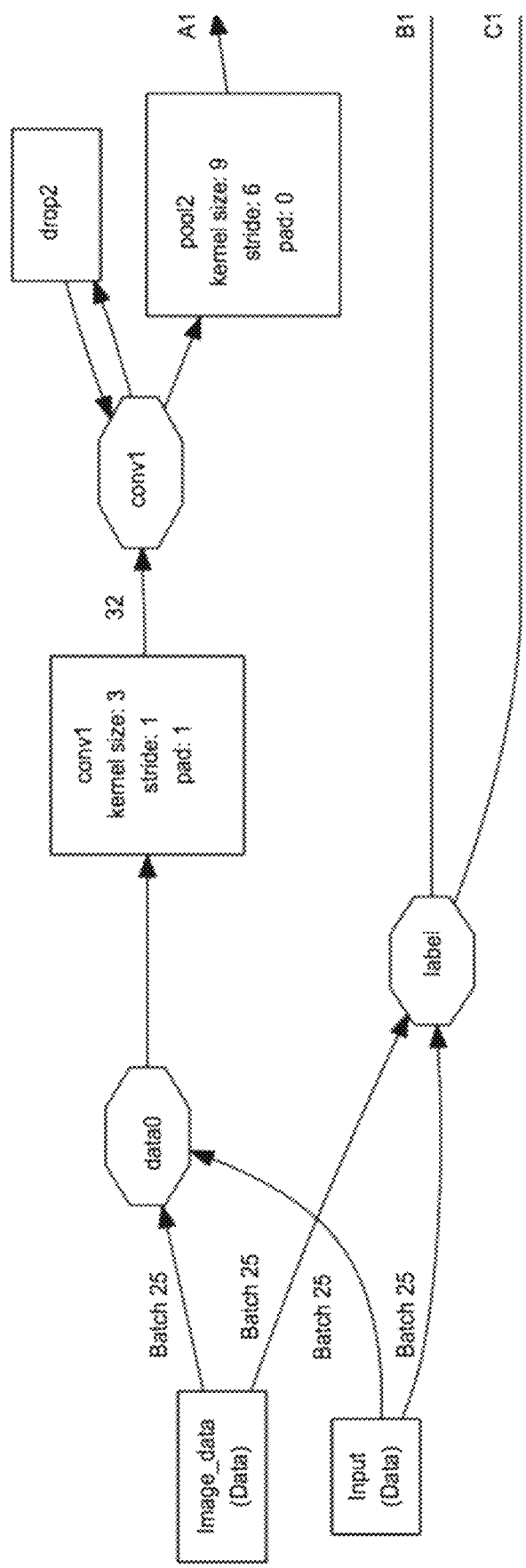
FIGS. 8 and 9 show an exemplary neural network rendered by the asynchronous evolutionary process.
Figure 9:
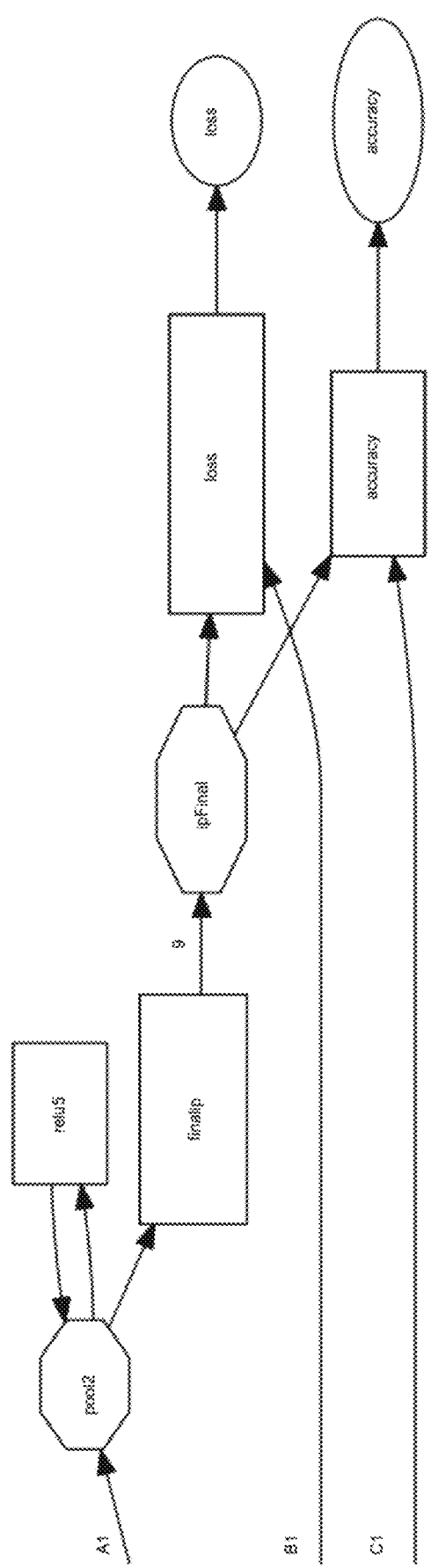

FIGS. 8 and 9 illustrate an evolved neural convolutional network that may be rendered by the asynchronous evolutionary processes and evolutionary networks described herein. The Image_data and Input represent image data coming into the network in batch that is stored in memory (as represented by the hexagonal elements labeled as data). The image data and the input are processed by a convolutional layer having a kernel size of 3, a stride of 1 and a pad of 1. The kernel size represents how many pixels the layer is processing. The stride controls how the filter convolves around the input volume of the image. Padding refers to the number of zeros stored around an image to obtain a desired output volume.

In FIG. 8, the convolutional layer with a kernel size of 3, a stride of 1 and a padding of 1 processes the input. The dropout layer (e.g., drop2) receives the output of the convolutional layer stored in memory (shown as conv1) and randomly sets selected values generated by the convolutional layer to zero. In FIG. 8, the placement of the dropout layer near the data layer is unusual for most neural networks and likely created by the evolutionary systems' crossing-over and/or mutation processes. Typical designs do not connect a dropout layer to a fully connected layer because it generates too much noise. The dropout layer augments the data set effectively making the output dataset look much larger than the actual dataset.

In FIG. 8, the pooling layer shown as pool2 is effectively a down sampling layer that reduces the spatial dimensions (the length and width change but not the depth) of the input. In FIG. 9, the output of the pooling layer (represented by the hexagonal element labeled pool2) is processed by a nonlinear layer or activation layer. In basic terms, this layer changes all the negative activations to zero. The layer increases the nonlinear properties of the model and the overall network without affecting the receptive fields of the inner product layer that follows. The final inner product layers are a scalar function of the input vectors. In FIG. 9, the final inner product is a product of the magnitudes of the input vector and a weighting vector multiplied by the cosine of the angle between them. Loss is then measured by mapping the non-normalized output to a probability distribution over a predicted output class such as through a SoftMax function. The networks accuracy is measured by processing ground truths that are labeled near the input of the network.

Figure 10:
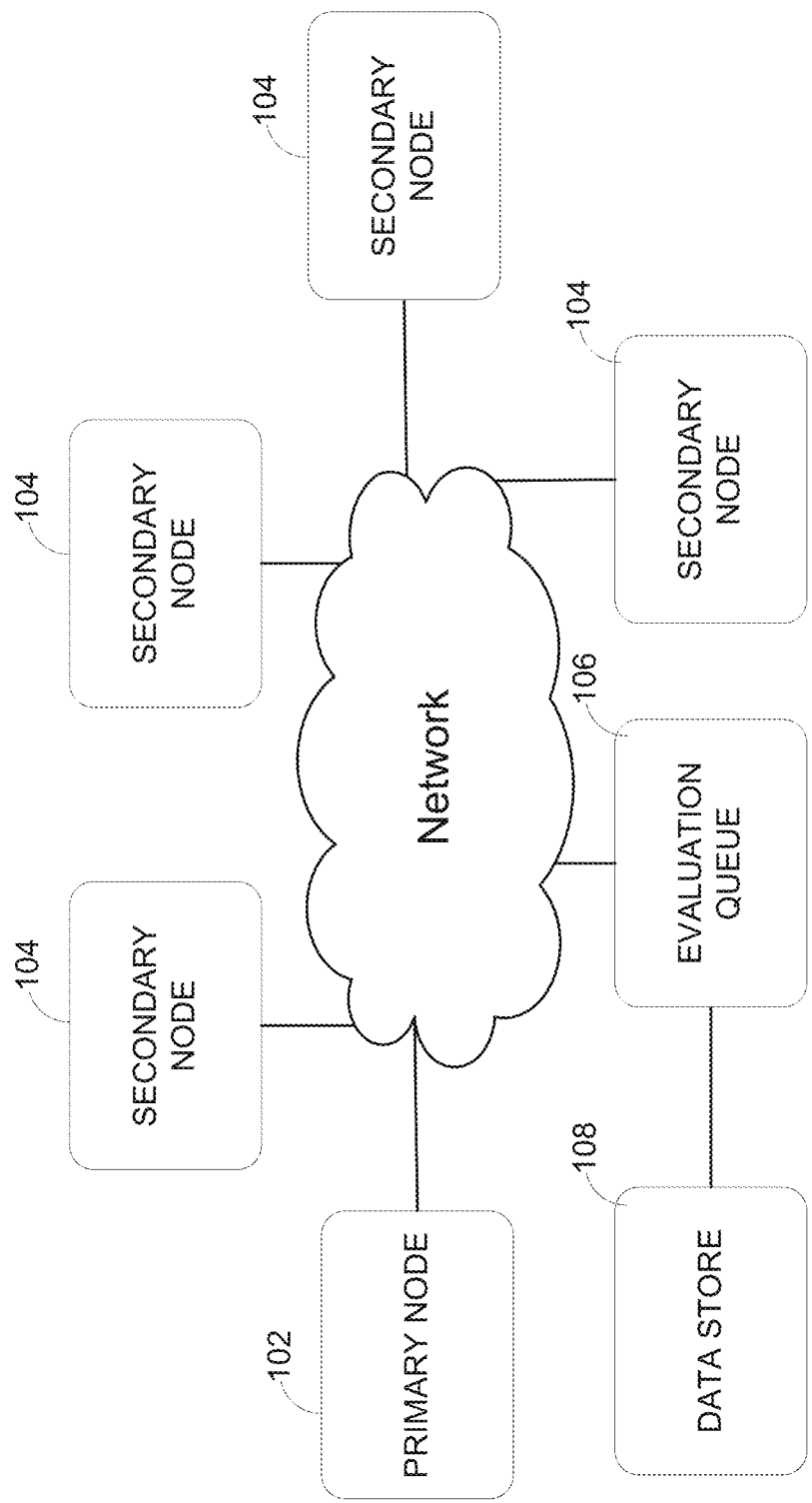
FIG. 10 is an alternate evolutionary network.

FIG. 10 is an alternate block diagram of the evolutionary network of FIG. 1. In FIG. 10, the communication bus of FIG. 1 is replaced by a network that allows the primary node 102, the secondary node 104, the data store 108, and the evaluation queue 106 to be hosted on remote distributed systems. The primary node 102, the secondary node 104, the data store 108, and the evaluation queue 106 and their alternates function as described herein.

Figure 11:
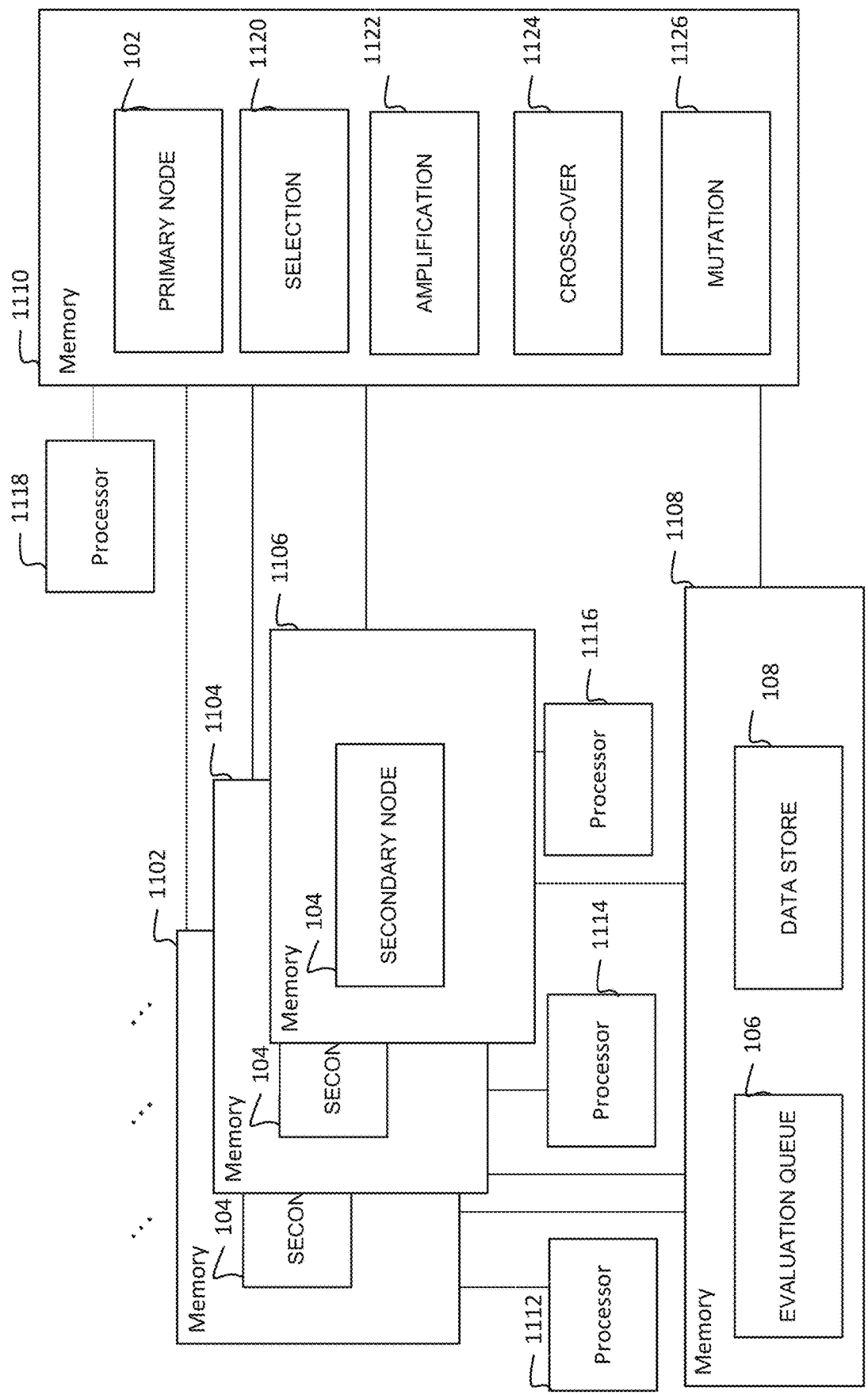
FIG. 11 is a second alternate evolutionary network.

FIG. 11 is a block diagram of a second alternate block diagram of the evolutionary network of FIG. 1. The system comprises multiple processors 1112-1118 (e.g., GPUs), multiple non-transitory media 1102-1110 such as multiple memories (the contents of which are accessible to the processors 1112-1118, respectively). The memories 1102-1110 may store instructions which when executed by one or more of the processors 1112-1118, respectively, causes the system to render some or all of the functionality associated with the evolutionary network and some or all of the functionality of the evolutionary processes. For example, the memory 1102-1110 may store instructions which when executed by one or more of the processor 1112-1118, respectively, causes the system to render the functionality associated with one or more secondary nodes 104, the evaluation queue 106, the data store 108, the primary node 102, neural network selection logic 1120 (e.g., executing the selection process executed by the primary node 102), gene amplification logic 1122 (e.g., executing the gene amplification process executed by the primary node 102), crossing-over logic (e.g., executing the cross-over process executed by the primary node 102) 1124, and mutation logic 1126 (e.g., executing the mutation process executed by the primary node 102). In addition, data structures, temporary variables, meta data and other information may store data in one or more memories 1102-1110.

The processors 1112-1118 may comprise a single processor with multiple cores or multiple processors with multiple cores, on multiple devices or distributed across more than one system that run in parallel. The processors 1112-1118 may be hardware that executes computer executable instructions or computer code embodied in the memory 1102-1110 or in other memory to perform one or more features of the disclosed system. The processors 1112-1118 may include a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memories 1102-1110 or storage disclosed may retain an ordered listing of executable instructions for implementing the functions described herein. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a Random Access Memory (RAM), a Read-Only Memory (ROM), an Erasable Programmable Read-Only Memory (EPROM or Flash memory), or a database management system. The memories 1102-1110 may comprise a single device or multiple devices that may be disposed on one or more dedicated memory devices or on a processor or other similar device.

The memories 1102-1110 may also store computer code that may include instructions executable by the processor 1112-1118. The computer code may be written in any computer language, such as C, C++, assembly language, channel program code, and/or any combination of computer languages. The memories 1102-1110 may store information in data structures.

The functions, acts or tasks illustrated in the figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device accessible to a petascale machine. In other embodiments, the logic or instructions are stored in a remote location for transfer through a computer networks or over wireless or tangible communication lines. In yet other embodiments, the logic or instructions may be stored and executed by multiple GPU servers.

The term "deep learning" refers to devices or machines that execute machine learning algorithms which use nonlinear processing units' multiple layers for feature transformation and extraction. Some deep learning devices represent concepts in multiple hierarchical fashion with corresponds to various levels of abstraction. The term "coupled," disclosed in this description may encompass both direct and indirect coupling. Thus, a first and a second element are said to be coupled when they communicate directly with one another, as well as when the first element communicates through an intermediate component, which is connected directly or via one or more additional intermediate components to a second element. The term "substantially" or "about" may encompass a range that is largely, but not necessarily wholly, what is specified. It encompasses all but an insignificant amount, such as a variance within five or ten percent. When devices are responsive to commands events, and/or requests, the actions and/or steps of the devices, such as the operations that devices are performing, necessarily occur as a direct or an indirect result of the preceding commands, events, actions, and/or requests. In other words, the operations occur as a result of the preceding operations. A device that is responsive to another requires more than an action (i.e., the device's response to) merely follow another action.

The disclosed systems and methods generate artificial neural networks like convolutional neural networks by determining the number of layers of a network, the sequence of the layers, the layer types, and/or the optimization of hyperparameters automatically. The systems apply an automated asynchronous iterative repetitive evolutionary process that generate neural networks on a petascale machines or lesser distributed parallel processing systems.

Using a gene structure, characteristics of the neural networks are automatically generated and optimized. Some networks are generated and optimized to dataset representations using graphics processors, others are generated and optimized using high-performance computing machines, others are generated and optimized using one or more processors, and others by using any combination of these structures. While the written description describes the systems and processes via neural and/or deep learning networks, the disclosed systems and processes may be used to optimize any network (e.g., two or more processors or devices that are connected via one or more communication links) that is trained to learn and adapt itself according to a desired result.

The subject-matter of the disclosure may also relate, among others, to the following aspects (referenced by numbers):

1. An automated system that designs and optimizes neural networks comprising:

a data store storing a plurality of gene vectors that represent a plurality of diverse and distinct neural networks;

an evaluation queue seeded with the plurality of gene vectors that are received from the data store;

a plurality of secondary nodes representing a plurality of independent first graphical processing units that automatically construct a plurality of neural networks by automatically decoding a plurality of gene vectors received from the evaluation queue, automatically train the plurality of constructed neural networks using a training dataset, automatically evaluate the plurality of constructed neural network using an evaluation data set, and automatically render a plurality of fitness values associated with the plurality of constructed neural networks asynchronously; and a primary node representing a second graphical processing unit that executes an asynchronous gene amplification on a select plurality of gene vectors received from the plurality of secondary nodes by automatically replicating the selected gene vectors, crossing-over the replicated gene vectors that represent different constructed neural networks by automatically exchanging gene segments between the replicated gene vectors, and mutating the crossing-over replicated gene vectors by randomly modifying one or more fields of the crossing-over replicated gene vectors automatically.

2. The system of aspect 1 where mutating the crossing-over replicated gene vectors comprise modifying a plurality of feature layers of the crossing-over replicated gene vectors.

3. The system of any of aspects 1 to 2 where mutating the crossing-over the replicated gene vectors comprise exchanging equal gene segments of the select plurality of gene vectors.

4. The system of any of aspects 1 to 3 where the number of gene vectors created by the gene amplification varies with the processing time of the plurality of secondary nodes.

5. The system of any of aspects 1 to 4 where the plurality of fitness values comprises a plurality of average values.

6. The system of aspect 5 where the plurality of gene vectors is selected based on a comparisons of fitness values to each of the fitness values associated with the constructed neural networks.

7. The system of any of aspects 1 to 6 where the number of plurality of gene vectors seeded in the evaluation queue comprises at least three times the number of secondary nodes.

8. The system of any of aspects 1 to 7 where the primary node and the plurality of secondary nodes comprise a petascale machine.

9. An automated method that designs and optimizes neural networks comprising:

storing a plurality of gene vectors that represent a plurality of diverse and distinct neural networks in a data store;

storing plurality of gene vectors received from the data store in an evaluation queue;

constructing a plurality of neural networks at a secondary node by automatically decoding a plurality of gene vectors received from the evaluation queue;

training the plurality of constructed neural networks automatically using a training dataset at the secondary node;

evaluating the plurality of constructed neural network automatically using an evaluation data set at the secondary node;

rendering a plurality of fitness values associated with the plurality of constructed neural networks asynchronously at the secondary node; and replicating selected gene vectors automatically at a primary node;

crossing-over the replicated gene vectors that represent different constructed neural networks by automatically exchanging gene segments between the replicated gene vectors at the primary node;

mutating the crossing-over replicated gene vectors at the primary node by randomly modifying one or more fields of the crossing-over replicated gene vectors automatically.

10. The method of aspect 9 where mutating the crossing-over replicated gene vectors comprises modifying a plurality of feature layers of the crossing-over replicated gene vectors.

11. The method of any of aspects 9 to 10 where mutating crossing-over the replicated gene vectors comprises exchanging equal gene segments of the select plurality of gene vectors.

12. The method of any of aspects 9 to 11 where the number of gene vectors created by the gene amplification varies with the processing speed of the secondary node.

13. The method of any of aspects 9 to 12 where the plurality of fitness values comprises a plurality of average values.

14. The method of any of aspects 9 to 13 where the plurality of gene vectors is selected based on a comparison of a plurality of fitness values to fitness values associated with the constructed neural networks.

15. The method of any of aspects 9 to 14 where the number of plurality of gene vectors stored in the evaluation queue comprises at least three times the number of secondary nodes.

16. The method of any of aspects 9 to 15 where the primary node and the secondary node comprises a petascale machine.

17. A non-transitory machine-readable medium encoded with machine-executable instructions, wherein execution of the machine-executable instructions is for:

storing a plurality of gene vectors that represent a plurality of diverse and distinct neural networks in a data store;

storing plurality of gene vectors received from the data store in an evaluation queue;

constructing a plurality of neural networks at a secondary node by automatically decoding a plurality of gene vectors received from the evaluation queue, training the plurality of constructed neural networks automatically using a training dataset at the secondary node;

evaluating the plurality of constructed neural network automatically using an evaluation data set at the secondary node;

rendering a plurality of fitness values associated with the plurality of constructed neural networks asynchronously at the secondary node;

replicating selected gene vectors automatically at a primary node;

crossing-over the replicated gene vectors that represent different constructed neural networks by automatically exchanging gene segments at the primary node; and mutating the crossing-over replicated gene vectors at the primary node by randomly modifying one or more fields of the crossing-over replicated gene vectors automatically.

18. The non-transitory machine-readable medium of aspect 17 where mutating the crossing-over replicated gene vectors comprises modifying a plurality of feature layers of the crossing-over replicated gene vectors.

19. The non-transitory machine-readable medium of any aspects 17 to 18 where mutating crossing-over the replicated gene vectors comprises exchanging equal gene segments of the select plurality of gene vectors.

20. The non-transitory machine-readable medium of any aspects 17 to 19 where the number of gene vectors created by the gene amplification varies with the processing speed of the secondary node.

While various embodiments of the invention have been described, it will be apparent to those of ordinary skill in the art that many more embodiments and implementations are possible within the scope of the inventions. Accordingly, the inventions are not to be restricted except in light of the attached claims and their equivalents.

What is claimed is:

1. An automated system that designs and optimizes neural networks comprising:

a non-transitory machine-readable medium encoded with machine-executable instructions, where execution of the machine-executable instructions is for:

storing a plurality of gene vectors that are randomly generated that represent a plurality of diverse and distinct randomly generated neural networks in a data store;

seeding an evaluation queue with the plurality of gene vectors that are received from the data store;

storing a plurality of secondary nodes representing a plurality of independent first graphical processing units that automatically construct, train, and evaluate a plurality of neural networks by automatically:

decoding a plurality of gene vectors received from the evaluation queue;

training the plurality of constructed neural networks using a training dataset;

evaluating the plurality of constructed neural networks using an evaluation data set; and rendering a plurality of fitness values associated with the plurality of constructed neural networks asynchronously; and storing a primary node representing a second graphical processing unit that executes an asynchronous gene amplification of a selected plurality of gene vectors selected from the plurality of gene vectors received from the plurality of secondary nodes by automatically:

replicating the selected plurality of gene vectors to generate replicated gene vectors based on selected fitness values selected from the plurality of fitness values that identify an increasing long-term accuracy trend to generate replicated gene vectors;

crossing-over the replicated gene vectors that represent different constructed neural networks by automatically exchanging gene segments between the replicated gene vectors to generate crossing-over replicated gene vectors;

applying a progressive constraint that limits the crossing-over the replicated gene vectors based on input dimensions of each layer of the constructed neural networks; and mutating the crossing-over replicated gene vectors by randomly modifying one or more fields of the crossing-over replicated gene vectors.

2. The system of claim 1, where mutating the crossing-over replicated gene vectors comprise modifying a plurality of feature layers of the crossing-over replicated gene vectors.

3. The system of claim 1, where mutating the crossing-over the replicated gene vectors comprise exchanging equal gene segments of the selected plurality of gene vectors.

4. The system of claim 1, where a total number of copies of the selected plurality of gene vectors created by the gene amplification varies with a processing time of the plurality of secondary nodes.

5. The system of claim 1, where the plurality of fitness values comprises a plurality of average values.

6. The system of claim 5, where the plurality of gene vectors is selected based on comparisons of fitness values to each of the fitness values associated with the constructed neural networks.

7. The system of claim 1, where a total number of the plurality of gene vectors seeded in the evaluation queue comprises at least three times the total number of the plurality of gene vectors stored in the plurality of secondary nodes.

8. The system of claim 1, where the primary node and the plurality of secondary nodes are stored in a memory accessible to a petascale machine.

9. An automated method that designs and optimizes neural networks comprising:

storing a plurality of gene vectors that are randomly generated and represent a plurality of diverse and distinct randomly generated neural networks in a data store;

storing plurality of gene vectors received from the data store in an evaluation queue;

constructing a plurality of neural networks at a secondary node by automatically decoding a plurality of gene vectors received from the evaluation queue;

training the plurality of constructed neural networks automatically using a training dataset at the secondary node; evaluating the plurality of constructed neural network automatically using an evaluation data set at the secondary node;

rendering a plurality of fitness values associated with the plurality of constructed neural networks asynchronously at the secondary node;

replicating selected gene vectors selected from the plurality of gene vectors automatically at a primary node based on selected fitness values selected from the plurality of fitness values that identify an increasing long-term accuracy trend to generate replicated gene vectors;

crossing-over the replicated gene vectors that represent different constructed neural networks by automatically exchanging gene segments between the replicated gene vectors at the primary node to generate crossing-over replicated gene vectors;

applying a progressive constraint that limits the crossing-over the replicated gene vectors based on input dimensions of each layer of the constructed neural networks; and mutating the crossing-over replicated gene vectors at the primary node by randomly modifying one or more fields of the crossing-over replicated gene vectors automatically.

10. The method of claim 9, where mutating the crossing-over replicated gene vectors comprises modifying a plurality of feature layers of the crossing-over replicated gene vectors.

11. The method of claim 9, where mutating crossing-over the replicated gene vectors comprises exchanging equal gene segments of the select plurality of gene vectors.

12. The method of claim 9, where a total number of copies of the selected plurality of gene vectors created by the replicating varies with a processing speed of the secondary node.

13. The method of claim 9, where the plurality of fitness values comprises a plurality of average values.

14. The method of claim 9, where the plurality of gene vectors is selected based on a comparison of a plurality of fitness values to fitness values associated with the constructed neural networks.

15. The method of claim 9, where a total number of the plurality of gene vectors stored in the evaluation queue comprises at least three times the total number of the plurality of gene vectors stored in the secondary node.

16. The method of claim 9, where the primary node and the secondary node are stored in a memory accessible to a petascale computer.

17. A non-transitory machine-readable medium encoded with machine-executable instructions, wherein execution of the machine-executable instructions is for:

storing a plurality of gene vectors that are randomly generated and represent a plurality of diverse and distinct randomly generated neural networks in a data store;

storing plurality of gene vectors received from the data store in an evaluation queue;

constructing a plurality of neural networks at a secondary node by automatically decoding a plurality of gene vectors received from the evaluation queue;

training the plurality of constructed neural networks automatically using a training dataset at the secondary node;

evaluating the plurality of constructed neural network automatically using an evaluation data set at the secondary node;

rendering a plurality of fitness values associated with the plurality of constructed neural networks asynchronously at the secondary node;

replicating selected gene vectors selected from the plurality of gene vectors automatically at a primary node based on selected fitness values selected from the plurality of fitness values that identify an increasing long-term accuracy trend to generate replicated gene vectors;

crossing-over the replicated gene vectors that represent different constructed neural networks by automatically exchanging gene segments at the primary node to generate crossing-over replicated gene vectors;

applying a progressive constraint that limits the crossing-over the replicated gene vectors based on input dimensions of each layer of the constructed neural networks; and mutating the crossing-over replicated gene vectors at the primary node by randomly modifying one or more fields of the crossing-over replicated gene vectors automatically.

18. The non-transitory machine-readable medium of claim 17, where mutating the crossing-over replicated gene vectors comprises modifying a plurality of feature layers of the crossing-over replicated gene vectors.

19. The non-transitory machine-readable medium of claim 17, where mutating crossing-over the replicated gene vectors comprises exchanging equal gene segments of the select plurality of gene vectors.

20. The non-transitory machine-readable medium of claim 17, where a total number of copies of the selected plurality of gene vectors created by the replicating varies with a processing speed of the secondary node.

21. The system of claim 1, where the different constructed neural networks comprise a plurality of layers having hyperparameters associated with each layer, respectively, and further comprising storing a plurality of limiting rules that limit a selection of hyperparameters associated with a selected layer to a range of hyperparameters that can be processed by an input of a successive layer.

* * * * *